United States Patent
de la Iglesia

(10) Patent No.: US 8,832,384 B1
(45) Date of Patent: Sep. 9, 2014

(54) REASSEMBLING ABSTRACTED MEMORY ACCESSES FOR PREFETCHING

(75) Inventor: Erik de la Iglesia, Sunnyvale, CA (US)

(73) Assignee: Violin Memory, Inc., Santa Clara, CA (US)

( * ) Notice: Subject to any disclaimer, the term of this patent is extended or adjusted under 35 U.S.C. 154(b) by 354 days.

(21) Appl. No.: 12/846,568

(22) Filed: Jul. 29, 2010

(51) Int. Cl.
*G06F 12/00* (2006.01)

(52) U.S. Cl.
USPC ............ 711/137; 711/213; 712/207; 712/237

(58) Field of Classification Search
USPC .......................... 711/137, 213; 712/207, 237
See application file for complete search history.

(56) References Cited

U.S. PATENT DOCUMENTS

| | | |
|---|---|---|
| 5,954,796 A | 9/1999 | McCarthy et al. |
| 6,041,366 A | 3/2000 | Maddalozzo et al. |
| 6,401,147 B1 | 6/2002 | Sang et al. |
| 6,636,982 B1 | 10/2003 | Rowlands |
| 6,678,795 B1 | 1/2004 | Moreno et al. |
| 6,721,870 B1 | 4/2004 | Yochai et al. |
| 6,742,084 B1 | 5/2004 | Defouw et al. |
| 6,789,171 B2 | 9/2004 | Desai et al. |
| 6,810,470 B1 | 10/2004 | Wiseman et al. |
| 7,017,084 B2 | 3/2006 | Ng et al. |
| 7,089,370 B2 | 8/2006 | Luick |
| 7,110,359 B1 | 9/2006 | Acharya |
| 7,856,533 B2 | 12/2010 | Hur et al. |
| 7,870,351 B2 | 1/2011 | Resnick |
| 7,873,619 B1 | 1/2011 | Faibish et al. |
| 7,975,108 B1 | 7/2011 | Holscher et al. |
| 8,010,485 B1 | 8/2011 | Chatterjee et al. |
| 2002/0035655 A1 | 3/2002 | Finn et al. |
| 2002/0175998 A1 | 11/2002 | Hoang |
| 2002/0194434 A1 | 12/2002 | Kurasugi |
| 2003/0012204 A1 | 1/2003 | Czeiger et al. |
| 2003/0167327 A1 | 9/2003 | Baldwin et al. |
| 2003/0177168 A1 | 9/2003 | Heitman et al. |
| 2003/0210248 A1 | 11/2003 | Wyatt |
| 2004/0128363 A1 | 7/2004 | Yamagami et al. |
| 2004/0146046 A1 | 7/2004 | Jo et al. |
| 2004/0186945 A1 | 9/2004 | Jeter et al. |
| 2004/0215923 A1 | 10/2004 | Royer |
| 2005/0025075 A1 | 2/2005 | Dutt et al. |
| 2005/0195736 A1 | 9/2005 | Matsuda |
| 2006/0005074 A1 | 1/2006 | Yanai et al. |
| 2006/0034302 A1 | 2/2006 | Peterson |
| 2006/0053263 A1 | 3/2006 | Prahlad et al. |
| 2006/0075191 A1 | 4/2006 | Lolayekar et al. |

(Continued)

OTHER PUBLICATIONS

Stolowitz Ford Cowger Listing of Related Cases, Feb. 7, 2012.

(Continued)

*Primary Examiner* — Midys Rojas
(74) *Attorney, Agent, or Firm* — Brinks Gilson & Lione

(57) ABSTRACT

A storage proxy receives different abstracted memory access requests that are abstracted from the original memory access requests from different sources. The storage proxy reconstructs the characteristics of the original memory access requests from the abstracted memory access requests and makes prefetch decisions based on the reconstructed characteristics. An inflight table is configured to identify contiguous address ranges formed by an accumulation of sub-address ranges used by different abstracted memory access requests. An operation table is configured to identify the number of times the contiguous address ranges are formed by the memory access operations. A processor is then configured to prefetch the contiguous address ranges for certain corresponding read requests.

23 Claims, 10 Drawing Sheets

(56) References Cited

U.S. PATENT DOCUMENTS

| | | |
|---|---|---|
| 2006/0112232 A1 | 5/2006 | Zohar et al. |
| 2006/0212524 A1 | 9/2006 | Wu et al. |
| 2006/0218389 A1 | 9/2006 | Li et al. |
| 2006/0277329 A1 | 12/2006 | Paulson et al. |
| 2007/0050548 A1 | 3/2007 | Bali et al. |
| 2007/0079105 A1 | 4/2007 | Thompson |
| 2007/0118710 A1 | 5/2007 | Yamakawa et al. |
| 2007/0124407 A1 | 5/2007 | Weber et al. |
| 2007/0192444 A1 | 8/2007 | Ackaouy et al. |
| 2007/0233700 A1 | 10/2007 | Tomonaga |
| 2007/0283086 A1 | 12/2007 | Bates |
| 2008/0028162 A1 | 1/2008 | Thompson |
| 2008/0098173 A1 | 4/2008 | Chidambaran et al. |
| 2008/0104363 A1* | 5/2008 | Raj et al. .................... 711/207 |
| 2008/0162864 A1 | 7/2008 | Sugumar et al. |
| 2008/0215827 A1 | 9/2008 | Pepper |
| 2008/0215834 A1 | 9/2008 | Dumitru et al. |
| 2008/0250195 A1 | 10/2008 | Chow et al. |
| 2008/0320269 A1 | 12/2008 | Houlihan et al. |
| 2009/0006725 A1 | 1/2009 | Ito et al. |
| 2009/0006745 A1 | 1/2009 | Cavallo et al. |
| 2009/0034377 A1 | 2/2009 | English et al. |
| 2009/0110000 A1 | 4/2009 | Brorup |
| 2009/0240873 A1 | 9/2009 | Yu et al. |
| 2009/0259800 A1 | 10/2009 | Kilzer et al. |
| 2009/0262741 A1 | 10/2009 | Jungck et al. |
| 2009/0276588 A1 | 11/2009 | Murase |
| 2009/0307388 A1 | 12/2009 | Tchapda |
| 2010/0011154 A1 | 1/2010 | Yeh |
| 2010/0030809 A1 | 2/2010 | Nath |
| 2010/0080237 A1 | 4/2010 | Dai et al. |
| 2010/0088469 A1 | 4/2010 | Motonaga et al. |
| 2010/0115206 A1 | 5/2010 | de la Iglesia et al. |
| 2010/0115211 A1 | 5/2010 | de la Iglesia et al. |
| 2010/0122020 A1 | 5/2010 | Sikdar et al. |
| 2010/0125857 A1 | 5/2010 | Dommeti et al. |
| 2010/0169544 A1 | 7/2010 | Eom et al. |
| 2010/0174939 A1 | 7/2010 | Vexler |
| 2011/0047347 A1 | 2/2011 | Li et al. |
| 2011/0258362 A1 | 10/2011 | McLaren et al. |
| 2012/0198176 A1* | 8/2012 | Hooker et al. ................ 711/137 |

OTHER PUBLICATIONS

Rosenblum, Mendel and Ousterhout, John K., The LFS Storage Manager. Proceedings of the 1990 Summer Usenix. 1990 pp. 315-324.

Mark Friedman, Odysseas Pentakalos. Windows 2000 Performance Guide. File Cache Performance and Tuning [reprinted online], O'Reilly Media. Jan. 2002 [retrieved on Oct. 29, 2012]. Retrieved from the internet: <URL:http://technet.microsoft.com/en-us/library/bb742613.aspx#mainSection>.

* cited by examiner

REASSEMBLING ABSTRACTED MEMORY ACCESSES FOR PREFETCHING

BACKGROUND

Prefetching is a caching technique used for improving the performance of memory systems. Caching increases performance by keeping copies of accessed data, in the hope that the cached data will be accessed again sometime relatively soon thereafter. Prefetch systems usually have to identify what data to prefetch, the circumstances under which the prefetch should occur, and the length of time to cache the prefetched data. If the wrong data is prefetched, no accesses to the data will occur and no performance improvements will be realized. Likewise, if the right data is fetched at the wrong time, it may be replaced by other caching data before being accessed. Incorrectly specifying the "keep time" will have a similar effect.

In many computer architectures different devices, applications, or elements request data from the same memory system. The memory accesses from these different devices and applications can also be abstracted by other devices or elements. For example, an operating system may break a read request from a software application into a plurality of different individual read operations. Memory access requests from different sources and the abstractions made by other processing elements make it extremely difficult to correctly identify memory access patterns and provide effective prefetching.

DETAILED DESCRIPTION

Figure 1:
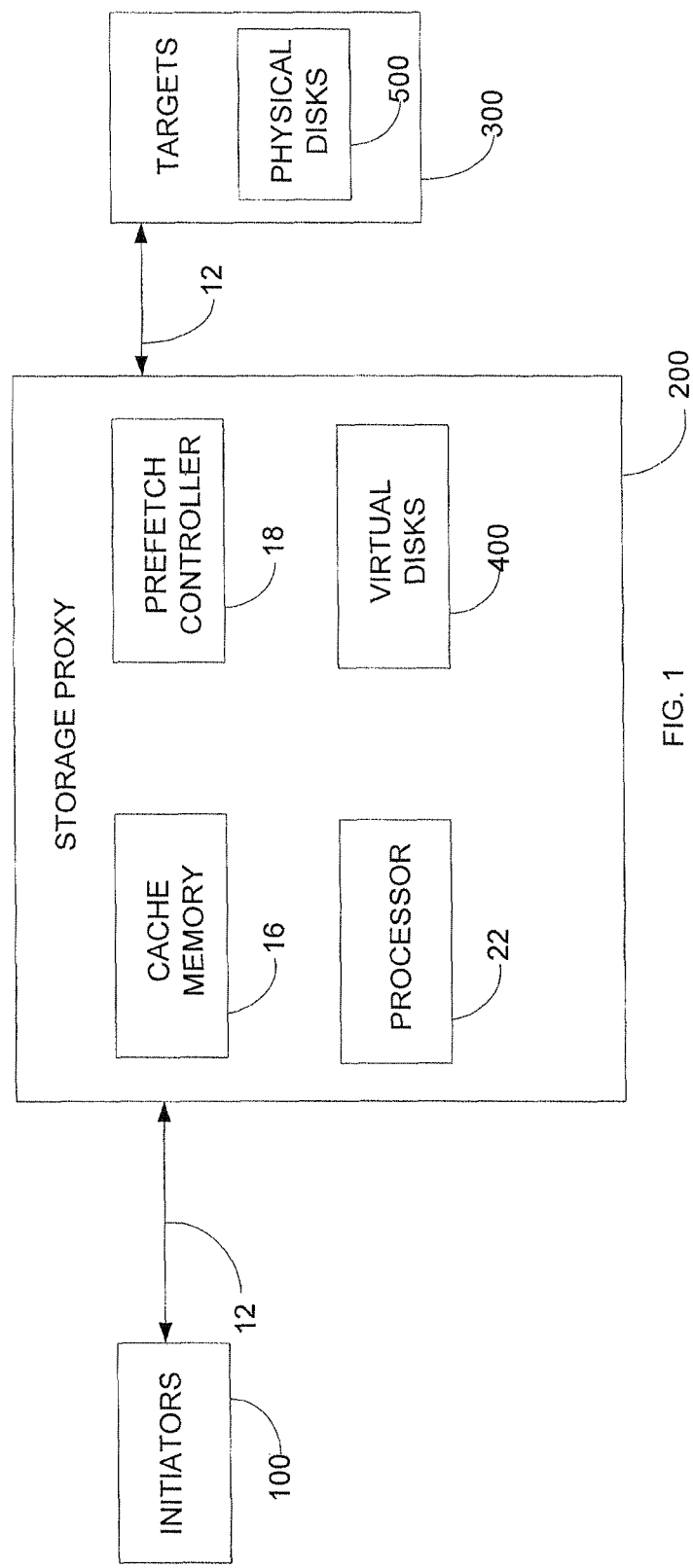
FIG. 1 is a block diagram of a storage proxy.

Referring to FIG. 1, a storage proxy 200 is deployed between initiators 100 and targets 300. The initiators 100 can be any device or application that writes and reads data to and from another device. The targets 300 can be any device that stores data that is accessed by another device, application, software, initiators, etc. In some embodiments, the targets 300 are storage devices or storage servers that contain storage media such as solid state memory and/or storage disks. In one embodiment, the targets 300 may also contain multiple storage disks that are referred to generally as a disk array.

The initiators 100 and targets 300 can be directly connected, or connected to each other through a network or fabric. In some embodiments, the initiators 100 are servers, server applications, routers, switches, client computers, personal computers, Personal Digital Assistants (PDA), or any other wired or wireless computing device that needs to access the data in targets 300. In one embodiment, the initiators 100 may be stand-alone appliances, devices, or blades, and the targets 300 are stand-alone storage arrays.

In some embodiments, the initiators 100, storage proxy 200, and targets 300 are each coupled to each other via wired or wireless Internet connections 12. In other embodiments, the initiators 100 may be a processor or applications in a personal computer or server that accesses one or more targets 300 over an internal or external data bus. The targets 300 in this embodiment could be located in the personal computer or server 100, or could also be a stand-alone device coupled to the computer/initiators 1000 via a computer bus or packet switched network connection.

The storage proxy 200 could be hardware and/or software located in a storage appliance, wireless or wired router, gateway, firewall, switch, or any other computer processing system. The storage proxy 200 provides an abstraction of physical disks 500 in targets 300 as virtual disks 400. In one embodiment, the physical disks 500 and the virtual disks 400 may be identical in size and configuration. In other embodiments the virtual disks 400 could consist of stripes of data or volumes of data that extend across multiple different physical disks 500.

Different communication protocols can be used over connections 12 between initiators 100 and targets 300. Typical protocols include Fibre Channel Protocol (FCP), Small Computer System Interface (SCSI), Advanced Technology Attachment (ATA) and encapsulated protocols such as Fibre Channel over Ethernet (FCoE), Internet Small Computer System Interface (ISCSI), Fibre Channel over Internet Protocol (FCIP), ATA over Ethernet (AoE) and others. In one embodiment, the communication protocol is a routed protocol such that and number of intermediate routing or switching agents may be used to abstract connection 12.

The initiators 100 conduct different storage operations with the physical disks 500 in targets 300 though the storage proxy 200. The storage operations may include write operations and read operations that have associated storage addresses. These interactions with storage proxy 200 and other components of storage proxy 200 may be normalized to block-level operations such as "reads" and "writes" of an arbitrary number of blocks.

Storage proxy 200 contains a cache memory 16 used for accelerating accesses to targets 300. The cache memory 16 could be implemented with any memory device that provides relatively faster data access than the targets 300. In one embodiment, the cache memory 16 could be any combination of Dynamic Random Access Memory (DRAM) and/or Flash memory.

A prefetch controller 18 includes any combination of software and/or hardware within storage proxy 200 that controls cache memory 16. For example, the prefetch controller 18 could be a processor 22 that executes software instructions that when executed by the process 22 conduct the reconstruction and prefetch operations described below.

During a prefetch operation, prefetch controller 18 performs one or more reads to targets 300 and stores the data in cache memory 16. If subsequent reads from initiators 100 request the data in cache memory 16, storage proxy 200 returns the data directly from cache memory 16. Such a direct return is referred to as a "cache hit" and reduces the read time for applications on initiators 100 accessing targets 300. For example, a memory access to targets 300 can take several milliseconds while a memory access to cache memory 16 may be in the order of microseconds.

Prefetch controller 18 can operate in both a monitoring mode and an active mode. When operating in the monitoring mode, the prefetch controller 18 monitors and records read and write operations from initiators 100 to targets 300. The prefetch controller 18 uses the monitored information when performing subsequent caching operations.

FIGS. 2-7 show some of the challenges for a storage proxy 200 providing effective prefetching. Keep in mind that in one embodiment the storage proxy 200 operates as an intermediary between the initiators 100 and targets 300. Thus, in at least one embodiment, the storage proxy 200 is not privy to certain abstractions that may take place before receiving the memory access request on connection 12. The storage proxy 200 may also have no idea what applications originated the memory access requests.

Memory access patterns from different originating computing elements have to be correctly identified in order to correctly anticipate further memory access operations and prefetch the correct data. However, memory access requests may come from different initiators and may be abstracted by different software and hardware elements.

For example, the storage proxy 200 may receive memory access requests that are broken up into different portions and sent at different times. Further, the different portions of the broken up memory access requests may overlap with other broken up memory access requests from other computing elements. These disjointed overlapping memory access requests make it difficult for the storage proxy 200 to accurately identify memory access patterns for the processing elements that originated the requests.

Figure 2:
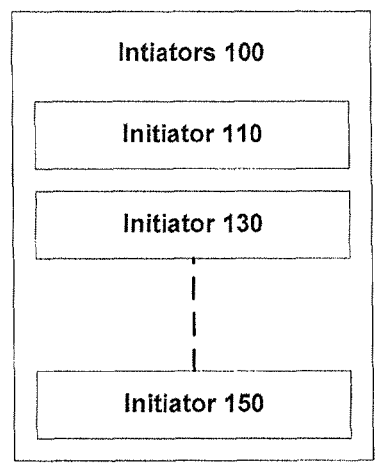
FIG. 2 shows different physical initiators that may initiate memory access requests.

FIG. 2 shows one embodiment of the initiators 100 of FIG. 1 in more detail. In this example, there may be multiple different physical or logical initiators 110, 130, 150, etc. that each independently initiate memory access requests to targets 300. For example, a physical initiator may be an independently operating server, computing element, processor, software module, etc. Logical initiators could be separate processing threads or logical software abstractions that independently initiate memory access requests. Because the storage proxy 200 may not know which initiators generate the memory access requests, it may be difficult to identify memory access patterns for the individual initiators 110, 130, and 150.

Figure 3:
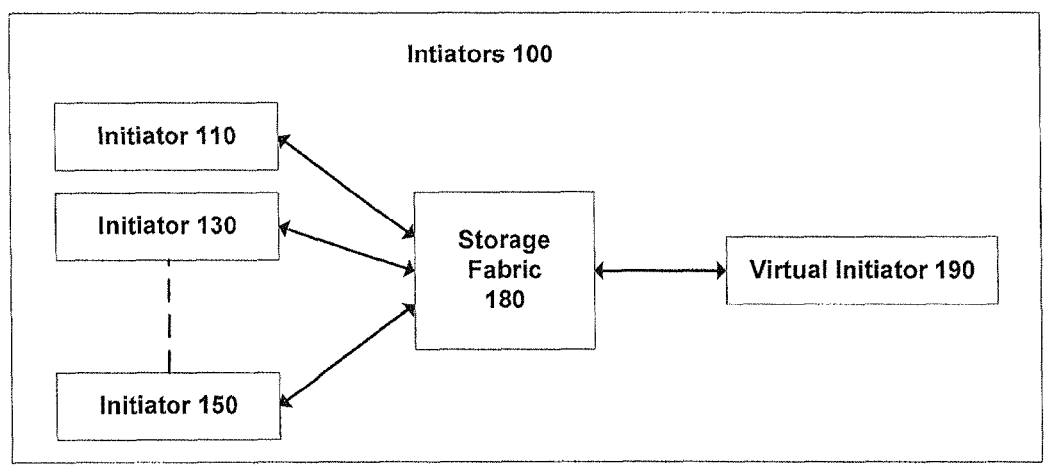
FIG. 3 shows how the memory access requests from the initiators in FIG. 2 can be abstracted by a storage fabric.

FIG. 3 shows an abstraction where the initiators 100 include different physical or logical initiators 110, 130, and 150 that each accesses the targets 300 in FIG. 1 through a storage fabric 180. The storage fabric 180 may abstract the memory access requests received from all of the differentiate initiators 110, 130, and 150 into one virtual initiator 190.

For example, the storage access requests from initiators 110, 130, 150 may all be repartitioned by a protocol such as FCP, SCSI, ATA, FCoE, ISCSI, AoE, etc. into other memory access requests that are interleaved and sent over the storage fabric 180. All of the repartitioned memory access requests are sent over the same storage fabric 180 and appear to the storage proxy 200 as all coming from one virtual initiator 190.

Figure 4:
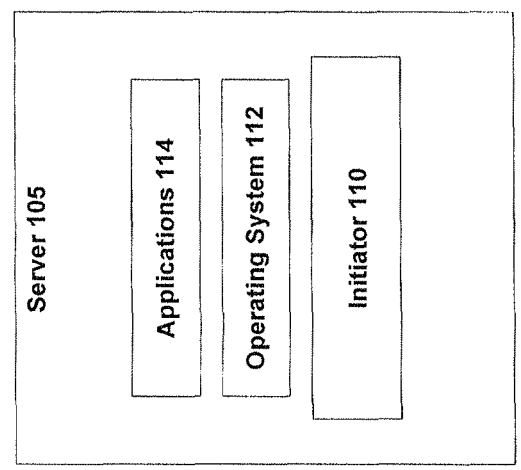
FIG. 4 shows how different computing elements in a server can abstract a memory access request.

FIG. 4 shows one embodiment where the initiator 110 is a Host Bus Adapter (HBA) fiber channel card located in a server or PC 105. The server 105 runs an operating system 112 and different applications 114 that run on top of the operating system 112. For example, a spreadsheet application 114 may need to read a 1 MegaByte (MB) file. The read is passed from the spreadsheet application 114 to the operating system 112 that then passes the read request to the HBA card 110.

The HBA card 110 asserts signals on a fiber channel bus connection 12 in FIG. 1 that requests the data from the targets 300. The storage proxy 200 receives the data access requests over the connection 12 and then either forwards the requests to the targets 300, or if available, supplies the requested data from the cache memory 16 in FIG. 1.

Figure 5:
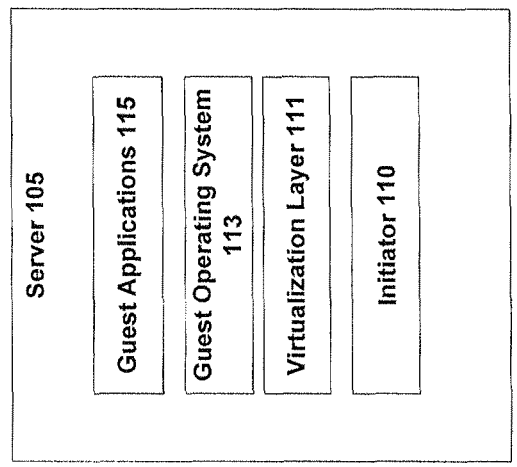
FIG. 5 shows how a virtualization layer in the server of FIG. 4 can further abstract a memory access request.

FIG. 5 shows an even more complex abstraction where a virtualization layer 111 such as VMware™ runs on the server or other computer system 105. Different guest applications 115 operate on top of guest operating systems 113.

Some of the guest applications 115 and guest operating systems 113 may be the same as the applications 114 and operating system 112 in FIG. 4. However an additional layer of abstraction provided by the virtualization layer 111 allows the different guest operating systems 113 to operate as if they run natively on the computer 105. As in FIG. 4, the HBA card 110 asserts signals on the fiber channel bus connection 12 in FIG. 1 that request data from the targets 300. The memory access requests on connection 12 are intercepted by the storage proxy 200.

The virtualization and abstractions comprise the differences between the memory access requests originally issued by the applications 114 and/or 115 in FIGS. 4 and 5 and the resulting read and write commands that are sent over the hardware bus or other connection 12 that are interpreted by the storage proxy 200.

Figure 6:
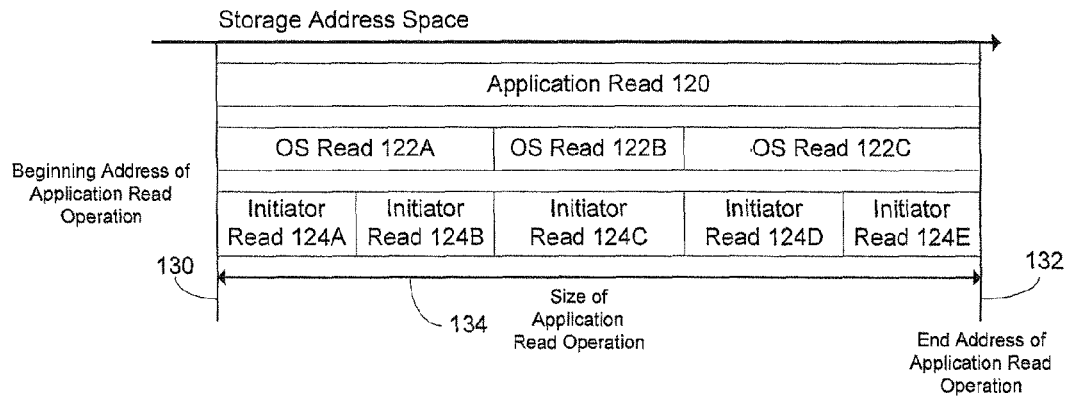
FIG. 6 is a schematic diagram showing one example of how the address of an application read is abstracted by an operating system and a storage fabric initiator.

FIG. 6 explains these virtualizations or abstractions in more detail. An application 114 in FIG. 4 may initiate an application read 120. The left vertical line 130 represents a beginning address of the application read 120 and the right vertical line 132 represents an ending address of the application read 120. The horizontal line 134 between vertical line 130 and vertical line 132 represents the size of the application read 120. For example, a spreadsheet application 114 may initiate a read request for 1.5 MB file. Line 130 represents the starting address of the 1.5 MB read and line 132 represents the ending address of the 1.5 read.

The operating system 112 in FIG. 4 may only have a 0.5 MB buffer and therefore may need to break the 1.5 MB application read 120 into three separate Operating System (OS) reads 122A, 122B, and 122C. The first OS read 122A has a starting address 130 and the second OS read 122B has a starting address that begins at the ending address of OS read 122A. The third OS read 122C has a starting address that starts at the ending address of OS read 122B and an ending address 132. The operating system 112 sends the three OS reads 122A, 122B and 122C to the HBA card/initiator 110 in FIG. 4 for sending to the targets 300.

The HBA card/initiator 110 may have yet another buffer size or a particular configuration or state that further abstracts the OS reads 122A, 122B, and 122C. For example, the HBA card 110 may break the first OS read 122A into two separate initiator reads 124A and 124B. The first initiator read 124A has the same starting address 130 as application read 120 and OS read 122A. The second initiator read 124B has a starting address that starts at the ending address of initiator read 124A and has the same ending address as OS read 122A.

The HBA card/initiator 110 may not dissect or abstract the second OS read 122B. In other words, the third initiator read 124C may have the same starting address as OS read 122B and the same ending address as OS read 122B. The HBA card/initiator 110 separates the third OS read 122C into two separate initiator reads 124D and 124E. The starting address of the fourth initiator read 124D starts at the starting address of OS read 122C. The fifth initiator read 124E starts at the ending address of initiator read 124D and has the same ending address 132 as application read 120 and OS read 122C.

It can be seen that the operating system 112 and the initiator 110 in FIG. 4 abstracts the read sizes of the previous upper processing element. It can also be seen that each series of read abstractions starts at the same beginning address 130 and ends at the same ending address 132.

Figure 7:
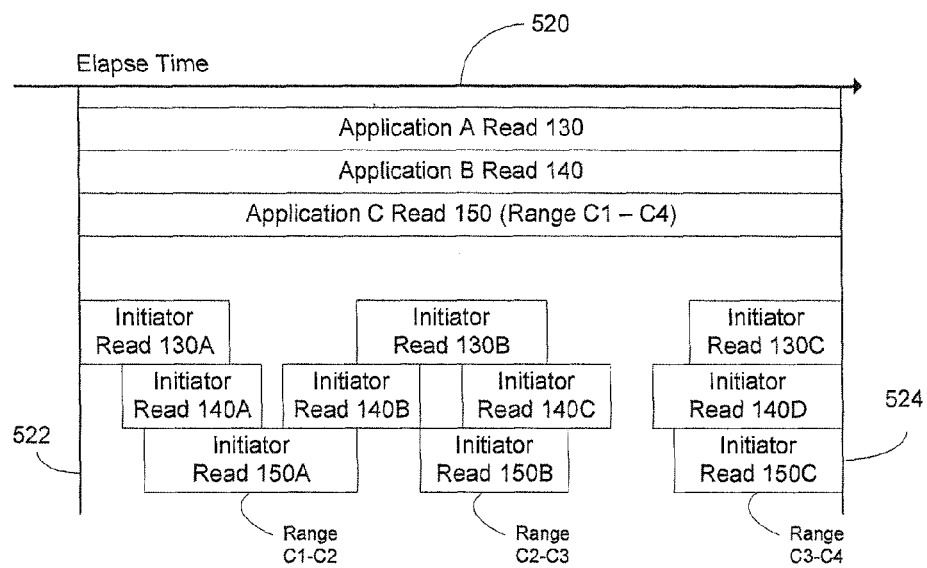
FIG. 7 is a schematic diagram showing one example of how an application read is abstracted over time by an operating system and a storage fabric initiator.

FIG. 7 further shows how the memory access operations are abstracted over time. The horizontal line 520 represents time, vertical line 522 represents a starting time, and vertical line 524 represents an ending time. This example shows three different read operations initiated by three different applications A, B, and C at the same time. Application A initiates a read 130, application B initiates a read 140, and application C initiates a read 150. Application C initiates a read operation 150 for a contiguous address range between address C1 and address C4.

Without delving into the possible time abstractions by the operating system 112, the HBA card/initiator 110 breaks the first read operation 130 from application A into three separate initiator reads 130A, 130B, and 130C. The initiator 110 breaks up the second read operation 140 from application B into four separate initiator reads 140A, 140B, 140C, and 140D. The initiator 110 breaks up the third read operation 150 from application C into three separate initiator reads 150A, 150B, and 150C.

The HBA card/initiator 110 also sends the broken up portions of the initiator reads 130, 140, and 150 at different discrete times. For example, based on a particular priority scheme, bandwidth, configuration, etc., the HBA card/initiator 110 may first send initiator read 130A at time 522, and then sends a sequence of initiator reads 140A, 150A, 140B, 130B, 150B, 140C, etc. Some of the initiator reads can also overlap in time. For example, the initiator read 130A may partially overlap with the next two sequential initiator reads 140A and 150A.

The storage proxy 200 receives these different disparate portions of different initiator reads 130, 140, and 150 over the connection 12 in FIG. 1. As shown in FIGS. 6 and 7, these different initiator memory access requests distort or abstract the original read requests 130, 140, 150 from applications A, B, and C. As stated above, the storage proxy 200 may not know which initiator reads are associated with applications A, B, or C. Therefore, the prefetch controller 18 in the storage proxy 200 may not normally be able to identify the overall sizes or patterns of the application reads 130, 140, and 150.

For example, the application A read 130 may repeatedly request 1 MBs of data. Once the prefetch controller 18 receives a first initiator read 130A, it would make sense to prefetch the entire 1 MBs of data associated with application read 130. However, the application A read 130 is abstracted into three piecemeal initiator reads 130A, 130B, and 130C. The prefetch controller 18 does not know that the three separate initiator reads 130A, 130B, and 130C are all part of the same 1 MB application read 130. Thus, the prefetch controller 18 cannot deduce that a 1 MB prefetch on initiator read 130A will likely contain hits for the two subsequent initiator reads 130B and 130C.

Also the address range for initiator read 140A may overlap with the address range of initiator read 130A. In response to a subsequent read request within the range of initiator read 130A, the prefetch controller 18 in FIG. 1 may try and prefetch all of the data within the address range covering both initiator read 130A and initiator read 140A. However, the reads from application A may be completely unrelated to the reads from application B and the data for initiator read 140A rarely, if ever, overlap with the data for initiator read 130A. The prefetch controller 18 may incorrectly prefetch the data for initiator read 140A when initiator read 130A is received.

Reconstructing Memory Accesses

Figure 8:
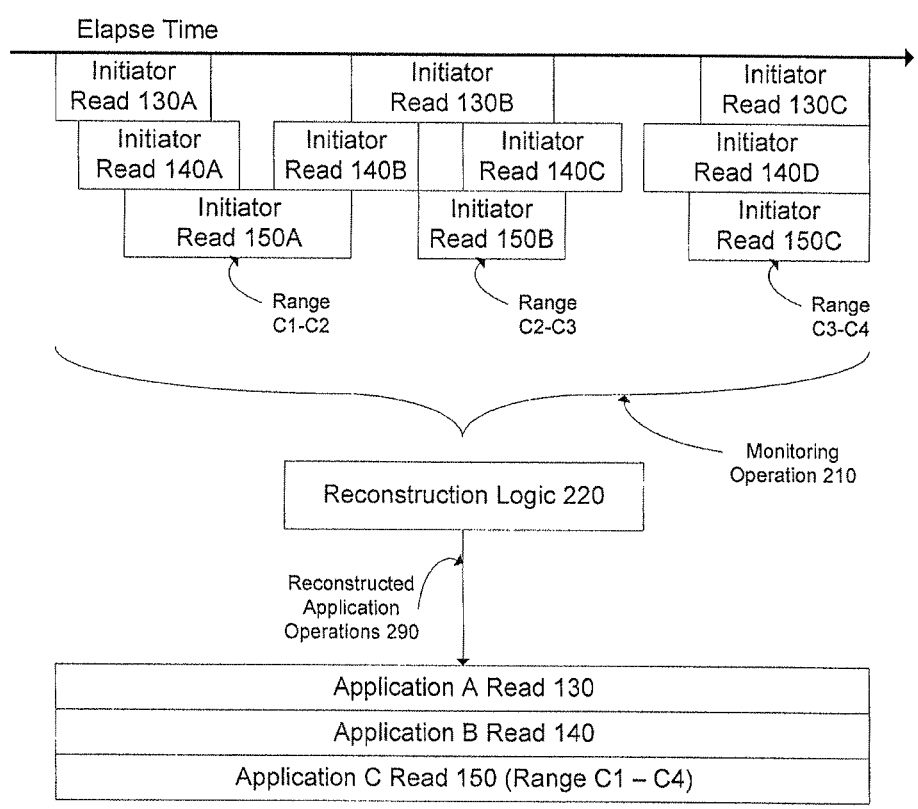
FIG. 8 is a block diagram showing reconstruction of an abstracted application read.

Referring to FIG. 8, the prefetch controller 18 includes reconstruction logic 220 that performs a monitoring operation 210 for all of the different initiator reads 130A-130C, 140A-140D, and 150A-150C received over the connection 12 in FIG. 1 from all of the different initiators 100.

The reconstruction logic 220 performs a reconstruction operation 290 described in more detail below that reconstructs or "de-abstracts" the different initiator reads back into the application A read 130, application B read 140, and application C read 150. The reconstruction operations 290 allow the prefetch controller 18 in FIG. 1 to then detect or "filter out" the patterns for the original memory access requests 130, 140, and 150. By reconstructing the read operations 130, 140, and 150, the prefetch controller 18 is able to identify different memory access patterns for more effective prefetching.

Figure 9:
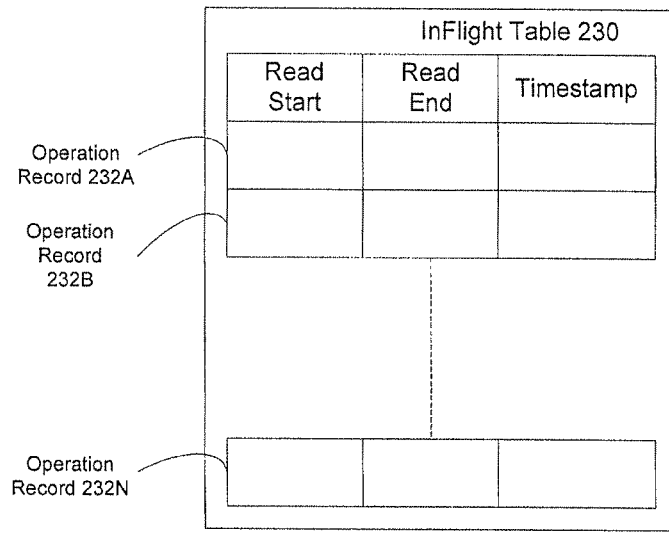
FIG. 9 is a block diagram showing an inflight table.

FIG. 9 shows an inflight table 230 used by the reconstruction logic 220 in FIG. 8. The inflight table 230 includes different operation records 232 that are either updated or replaced for each read operation received by the storage proxy 200 from the initiators 100. Each operation record 232 includes a read start address, a read end address, and a timestamp corresponding with the read operation.

The reconstruction logic 220 receives the read operations from the initiators 100 and identifies the starting address of the read operations. The reconstruction logic 220 then looks for one of the operation records 232 with a read end address that immediately precedes the starting address of the read operation. If the time difference between the newly received read operation and the time stamp for the identified operation record 232 is within some threshold, the ending address and timestamp for the newly received read operation are used in the identified operation record 232.

Figure 10:
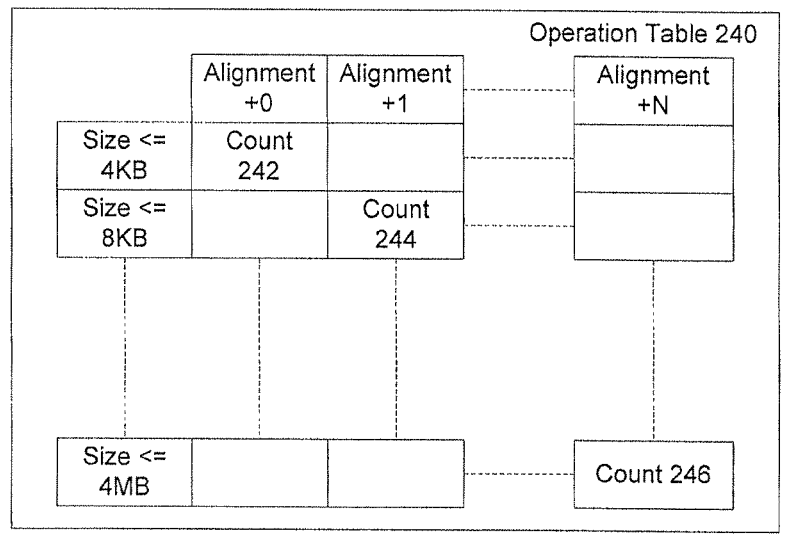
FIG. 10 is a block diagram showing an operation table.

FIG. 10 shows an operation table 240 that is also used by the reconstruction logic 220 in FIG. 8. The operation table 240 maps different alignment values with the sizes of different reconstructed read operations. These reconstructed read operations are alternatively referred to below as application reads, but could be any read operation reconstructed from any source.

The operation table 240 counts the number of reconstructed read operations for different alignments and read sizes. For example, the counter 242 in the first row and first column of operation table 240 counts the number of reconstructed read operations having a size of less or equal to 4 thousand bytes (KBs) and an alignment of 0. The counter 244 in the second row and second column of operation table 240 counts the number of reconstructed read operations with a size of 8 KB and an alignment of 1.

Figure 11:
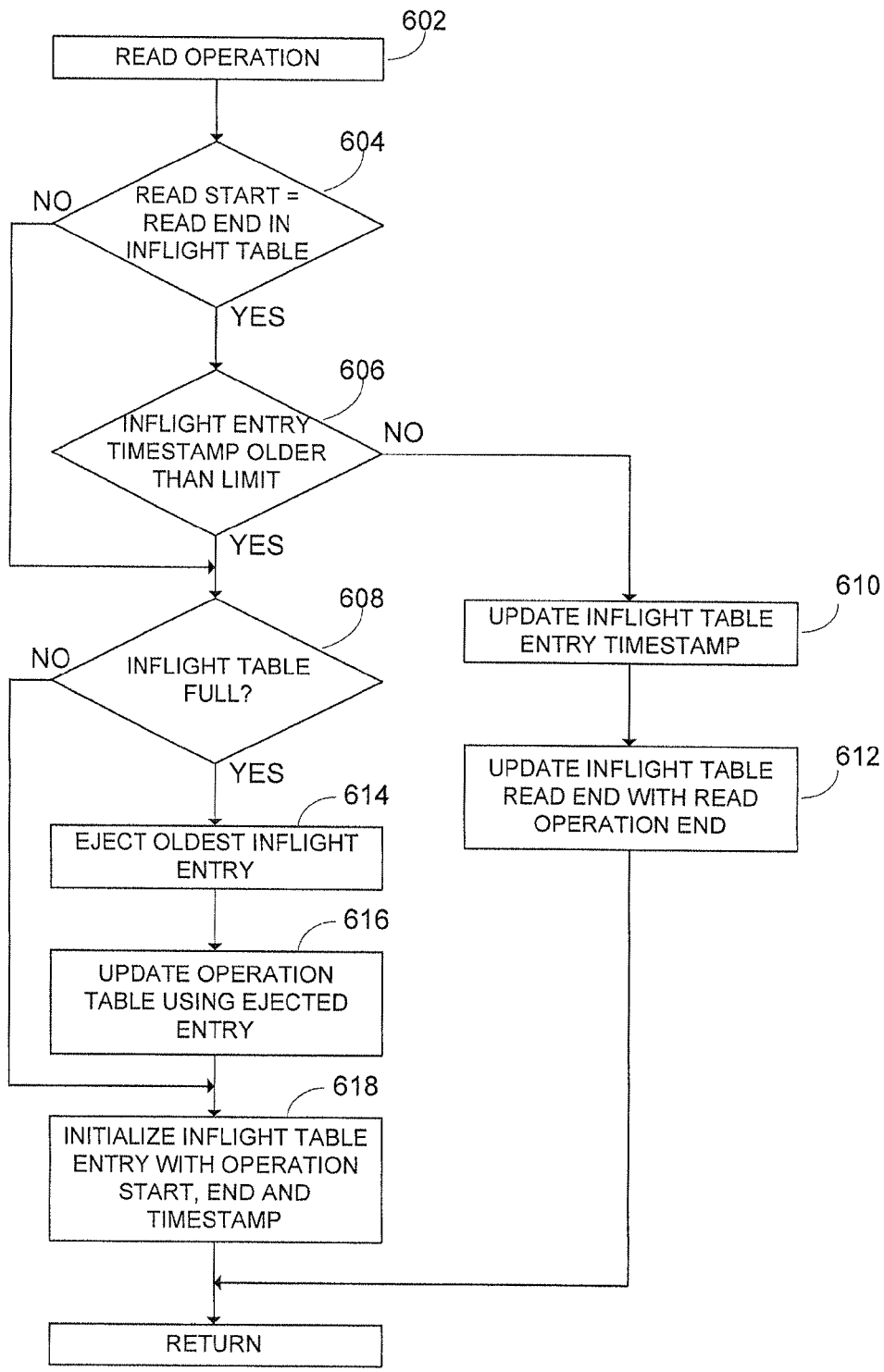
FIG. 11 is a flow diagram showing how the inflight table is used for reconstructing the abstracted application read.

Referring to FIGS. 9 and 11, the reconstruction logic 220 in FIG. 8 receives a new read operation request from one of the initiators 100 in operation 602. For example, this may be one of the abstracted initiator reads 130A-13C, 140A-140D, or 150A-150C shown in FIG. 8. The starting address of the read operation is compared in operation 604 with the values in the read end column of inflight table 230. The starting address of the received read operation matches one the read end addresses in the inflight table 230 when the starting address of the read operation is the next address after the read end address in inflight table 230. If the read operations are performed for blocks of data, then the next address may be the next contiguous block address after the block address identified in the read end columns for one of the operation records 232. Of course other schemes could also be used to identify contiguous read operations.

If a matching read end/read start is identified, the timestamp in inflight table 230 of the identified operation record is compared with the current time of the received read operation in operation 606. If the current time for the received read operation is within some time threshold of the timestamp in the identified operation record 232, the identified operation record 232 is updated in operations 610 and 612. In operation 610 the timestamp entry for the identified operation record 232 is updated with the timestamp or current time of the received read operation. In operation 612 the read end entry for the identified operation record 232 is updated with the ending address of the received read operation. In one embodiment, the timestamp comparison operation is omitted. In another embodiment, the time threshold for the timestamp comparison is dependent on the rate of read operations.

If there is no matching operation record 232 in the inflight table 230 in operation 604 or the timestamp is beyond the threshold, the reconstruction logic in operation 608 determines if the inflight table 230 is full. For example, the inflight table 230 may have a particular size threshold limiting the number of operation records 232 that can be added to the inflight table 230. If the inflight table 230 is not full in operation 608, a new operation record 232 is added to the inflight table 230 in operation 618. The new record 232 is initialized with the read start address and read end address for the received read operation. The timestamp in the new operation record is initialized to the current time for the received read operation. The current time may be any relative time indicator for received read operations. For example, the current time can be a counter indicating some relative time when the read operation was either sent from the initiators 100 or received at the storage proxy 200.

If the inflight table 230 is full in operation 608, the oldest operation record 232 in the inflight table is ejected in operation 614. In operation 616 the ejected operation record 232 is used for updating the operation table 240 in FIG. 10. This will be discussed in more detail below in FIGS. 14-16. A new operation record 232 is then added to the inflight table 230 in operation 618. The new operation record 232 is initialized with the read start address, read end address, and current time for the new read operation.

Figure 12:
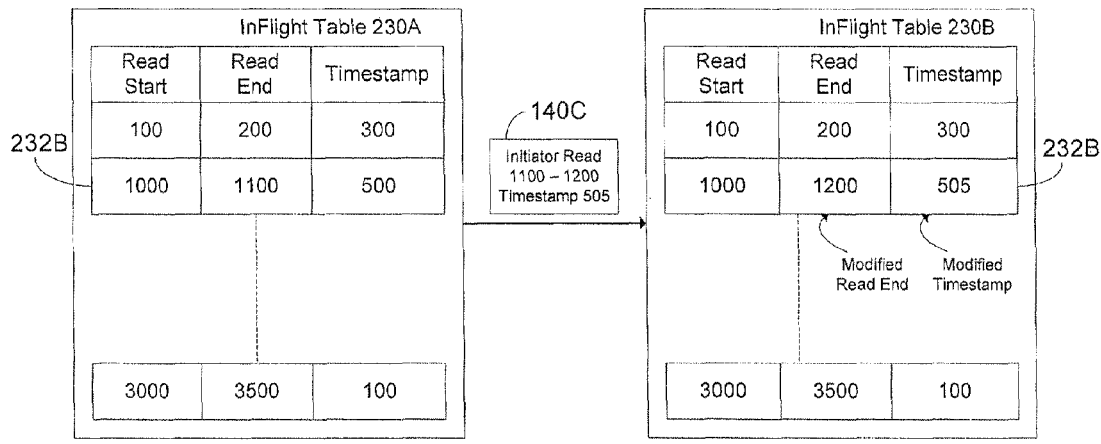
FIGS. 12 and 13 are block diagrams showing examples of how the inflight table is updated.
Figure 13:
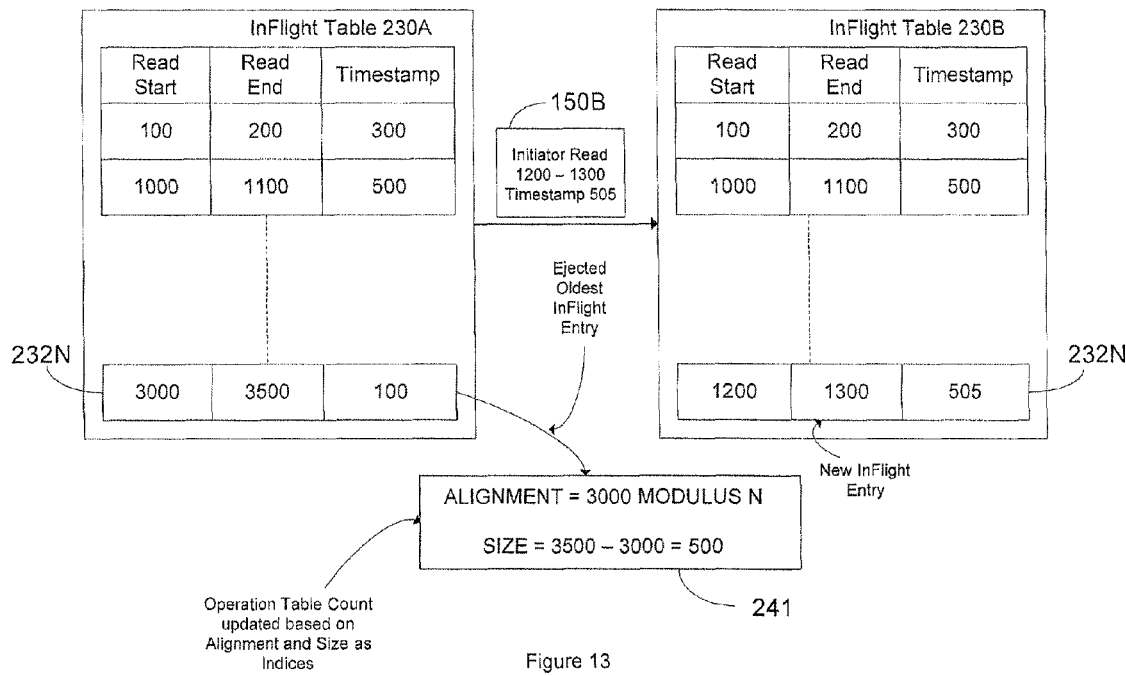

FIGS. 12 and 13 describe examples of the operations performed with the inflight table 230 in more detail. Referring first to FIG. 12, a first state of the inflight table 230A is shown on the left. In the first state the operation record 232B contains a read start address value of 1000, a read end address value of 1100, and a timestamp value of 500. The storage proxy 200 receives an initiator read 140C from one of the initiators 100 in FIG. 1. The initiator read 140C has a starting read address value of 1100, an ending read address value of 1200, and a current time value of 505.

The reconstruction logic 220 determines that the initiator read 140C matches operation record 232B. For example, the read end value 1100 in the operation record 232B matches the starting read address value 1100 for initiator read 140C. Of course these numbers are used for illustrative purposes and the actual matching address values may not necessarily be the same value but may be some contiguous sequential address value. The reconstruction logic 220 determines that the time value 505 associated with initiator read 140C is within some predetermined time threshold of timestamp value 500. Accordingly, the operation record 232B is updated in the inflight table state 230B. For example, the read end address value in operation record 232B is replaced with the ending address value 1200 in initiator read 140C. The timestamp value in operation record 232B is updated to the time value 505 for initiator read 140C.

FIG. 13 shows another example of how the inflight table 230 is updated responsive to a read operation. A current state of the inflight table 230A is shown on the left. The storage proxy 200 receives an initiator read 150B from one of the initiators 100 in FIG. 1. The initiator read 150B has a starting address value of 1200, an ending address value of 1300, and a current time value of 505.

The reconstruction logic 220 compares the starting address value for initiator read 150B with all of the read end address values in inflight table 230A. In this example there is no operation record 232 that matches with the initiator read 150B and the inflight table 230A is full. The reconstruction logic 220 ejects the oldest updated operation record 232N from the inflight table 230A and inserts a new operation record 232N that includes the information from initiator read 150B.

The operation record 232N has a lowest timestamp value of 100 for the inflight table 230A. In other words, the operation record 232N has resided in the inflight table 230A for the longest period of time without being updated. The information 241 from the ejected operation record 232N is used for updating the operation table 240 in FIG. 10. A read size in the operation record 232N is the difference between the read end address value and the read start address value. In this example, the size value is 3500−3000=500.

An alignment value in information 241 is also derived from the ejected operation record 232N by taking a modulus of the read start address value. For example, the modulus value may be 45 and the read start value for ejected operation record 232N is 3000. The modulus value is divided into the read start address value and the remainder is used as an alignment value. For example, 3000÷45=66 with a remainder of 30. The alignment value is therefore 30. In another embodiment, the modulus may be a power of two. For example, a modulus of eight could use three binary bits and the alignment values would then include the eight values 0, 1, 2, 3, 4, 5, 6, and 7. Of course any modulus value could be used. In one embodiment, the modulus is chosen based on the size of read operations performed by the initiators. In another embodiment, a modulus of 1 is chosen so as to effectively reduce Operation Table 240 into a single dimensional table based on operation size only.

The information 241 effectively reconstructs information for one of the larger application reads 130, 140 or 150 in FIG. 8 that was originally requested by one of the applications A, B, or C, respectively. By waiting a longest non-modified time period before ejecting the oldest operation record 232N, the reconstruction logic 220 is provided with enough time to combine together all of the separate pieces of the same application read that may have previously been separated or abstracted by other processing elements. For example, the reconstruction logic 220 accumulates the information together for the three separate initiator reads 130A, 130B, and 130C in FIG. 8 to identify the size of the original application A read 130.

The alignment values associate the reconstructed read information associate the information with a particular application, element, or source. For example, different applications A, B, and C or processing elements may have a tendency to start read operations at a particular address offset. The reconstruction logic 220 uses the modulus result as an address offset to associate the reconstructed read operation with a particular application or particular element that originated the memory access request.

The size of the inflight table 230 determines how much information can be obtained for the reconstructed read operations. More entries in the inflight table 230 increases the amount of information that can be obtained and the amount of time allotted for reconstructing a particular application read. The number of entries in the inflight table 230 can be configured according to the number of applications, threads, initiators, etc. that might request data at the same time. For example, the number of entries in the inflight table 230 may be the determined by the following formula:

(# of concurrent applications)×(# of concurrent threads per application)×(# of concurrent operating systems running on a virtualized platform)

An inflight table 230 larger than necessary (larger than that determined by the described formula) will not impact correct operation. However, the size of the table impacts the processing rate as the full table may need to be searched (each Operation Record compared) for every initiator read operation.

Prefetching

The operation table 240 in FIG. 10 is used for conducting prefetch operations. The operation table 240 is populated with an array of counters that track the number of reconstructed read operations within particular address ranges that have particular alignment offsets. For example, in FIG. 10 a number of alignment columns are provided for each 4 KB address range up to 4 MB. The size of each address range and the number of alignment offsets is also configurable. For example, the number of alignment offsets can vary by changing the modulus value.

In the operation table of FIG. 10 there is a counter 242 that tracks the number of reconstructed application read operations having a size of less 4 KB and that have an alignment of zero. There is another counter 244 that tracks the number of reconstructed application read operations having a size of 8 KB and alignment of 1. A counter 246 tracks the number of reconstructed application read operations having a size equal to 8 MB at a largest alignment offset value. The remaining counters, one for each combination of size and alignment are not shown for simplicity.

Figure 14:
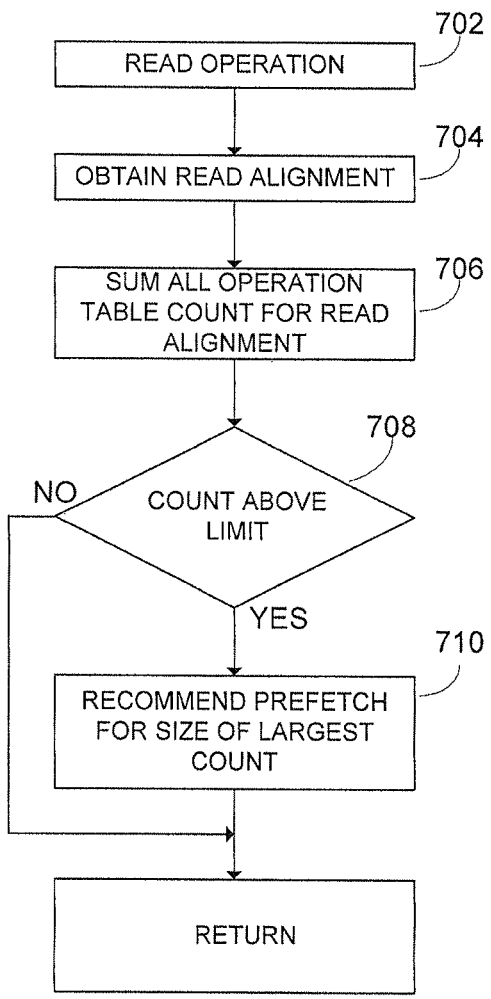
FIG. 14 is a flow diagram showing how the operation table in FIG. 10 is used for making prefetch recommendations.

Referring to FIG. 14, the prefetch controller 18 in FIG. 1 receives a read operation in operation 702. The prefetch controller 18 determines the read alignment for the read operation in operation 704. For example, the prefetch controller 18 divides the starting address value for the read operation by the same modulus value used on the ejected information 241 in FIG. 13. The count values in the column with the matching alignment are summed together in operation 706. For example, if the read operation has an alignment value of +5, then all of the counter values in the +5 column of operation table 240 are summed together in operation 706.

If the count sum is not over a predetermined limit in operation 708, then no prefetch operation is recommended and the prefetch controller 18 returns to reading the next read request in operation 702. If the count sum is above the count limit in operation 708, the prefetch controller 18 in operation 710 recommends prefetching the amount of data corresponding with the largest counter value in that alignment column. For example, the counter corresponding with a read size of 1 MB and am alignment of +5 may have the largest count value. The prefetch controller 18 may then prefetch a 1 MB block of data starting at the read start address of the current read operation.

Figures 15, 16:
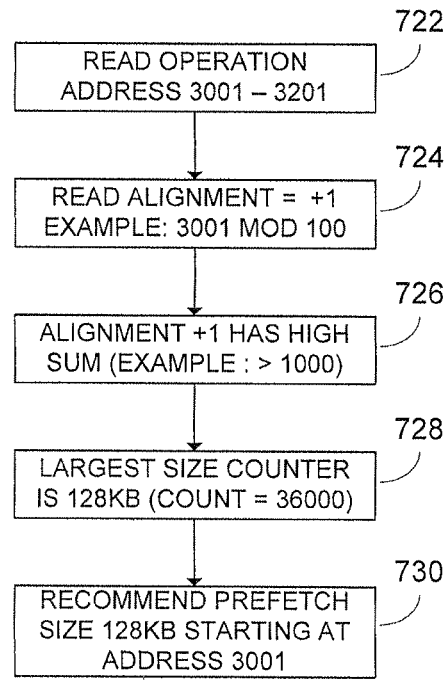
FIGS. 15 and 16 are diagrams showing other examples of how the operation table in FIG. 10 is used for making prefetch recommendations.

FIGS. 15 and 16 describe another example in more detail. FIG. 15 shows the operation table 240 containing different counter values for reconstructed read operations with an alignment of +1. In operation 722 of FIG. 16 the prefetch controller 18 receives a read operation starting at address 3001 and ending at address 3201. In this example, the modulus is 100. The prefetch controller 18 in operation 724 divides the starting address 3001 by modulus 100 to derive a remainder or alignment value of +1.

In this example the threshold high count value was previously set to 1000. The prefetch controller in operation 726 determines the total sum of the counter values for alignment+1 in operation table 240 of FIG. 15 is: 4+200+4000+200+200+3600+ . . . +2. Because this total is greater than 1000, the prefetch controller 18 recommends a prefetch operation. The prefetch controller 18 in operation 728 selects the prefetch size as the address range in the identified alignment column of operation table 240 having the largest count value. In this example, the address range size of 128 KB for alignment+1 has a highest count value of 36000. Therefore, the prefetch controller 18 in operation 730 recommends conducting a prefetch of 128 KB starting at address 3001 of the received read operation. Thus, the prefetch controller associates the starting address offset of the received read operation with the read access patterns in operation table 240 that likely were created by the same application or processing element.

Hardware and Software

Several examples have been described above with reference to the accompanying drawings. Various other examples are also possible and practical. The systems and methodologies may be implemented or applied in many different forms and should not be construed as being limited to the examples set forth above. Some systems described above may use dedicated processor systems, micro controllers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, embodiments of this disclosure may be implemented in a digital computing system, for example a CPU or similar processor. More specifically, the term "digital computing system," can mean any system that includes at least one digital processor and associated memory, wherein the digital processor can execute instructions or "code" stored in that memory. (The memory may store data as well.)

A digital processor includes but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or FLASH memory embedded in an integrated circuit Central Processing Unit (CPU), network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably). Programs, or code, are most useful when stored in a digital memory that can be read by one or more digital processors. The term "computer-readable storage medium" (or alternatively, "machine-readable storage medium") includes all of the foregoing types of memory, as well as new technologies that may arise in the future, as long as they are capable of storing digital information in the nature of a computer program or other data, at least temporarily, in such a manner that the stored information can be "read" by an appropriate digital processor. The term "computer-readable" is not intended to limit the phrase to the historical usage of "computer" to imply a complete mainframe, mini-computer, desktop or even laptop computer. Rather, the term refers to a storage medium readable by a digital processor or any digital computing system as broadly defined above. Such media may be any available media that is locally and/or remotely accessible by a computer or processor, and it includes both volatile and non-volatile media, removable and non-removable media, embedded or discrete.

Having described and illustrated a particular example system, it should be apparent that other systems may be modified in arrangement and detail without departing from the principles described above. Claim is made to all modifications and variations coming within the spirit and scope of the following claims.

The invention claimed is:

1. An apparatus, comprising:
logic circuitry configured to receive memory access requests that are abstracted from memory access requests, the logic circuitry further configured to reconstruct characteristics of the original memory access requests from the abstracted memory access requests and make prefetch decisions based on the reconstructed characteristics.

2. The apparatus of claim 1 further comprising an inflight table including operation records that identify start addresses, end addresses, and timestamps associated with the abstracted memory access requests.

3. The apparatus of claim 2 wherein the logic circuitry is configured to combine contiguous address ranges for two abstracted memory access requests into a same one of the operation records.

4. The apparatus of claim 2 wherein the logic circuit is configured to:
identify one of the operation records that has not been modified for the longest period of time; and
remove the identified one of the operation records when a threshold number of operation records are contained in the inflight table.

5. The apparatus of claim 4 wherein the logic circuit is configured to replace the removed one of the operation records with a new operation record that includes the start address, end address, and timestamp for a newly received one of the abstracted memory access requests.

6. The apparatus of claim 4 wherein the logic circuit is configured to identify a size for one of the original memory access requests from a starting address and ending address in the removed one of the operation records.

7. The apparatus of claim 6 wherein the logic circuit is configured to make a prefetch recommendation corresponding with the size identified from the removed one of the operation records.

8. The apparatus of claim 4 wherein the logic circuit is configured to identify an address offset for one of the original memory access requests from the starting address in the removed one of the operation records.

9. The apparatus according to claim 4 further comprising an operation table configured to track numbers of different address ranges and different address offsets identified in the operation records removed from the inflight table, and wherein the logic circuit is configured to make prefetch recommendations according to the tracked numbers in the operation table.

10. The apparatus of claim 2 wherein the logic circuit is configured to:
identify one of the operation records that has an starting address offset that matches a starting address offset for a received one of the abstracted memory access requests; and
conduct a prefetch for an address range identified in the identified one of the operation records.

11. The apparatus of claim 2 wherein the logic circuitry is configured to combine abstracted memory requests having contiguous address ranges into a same one of the records, including updating the timestamp.

12. The apparatus of claim 1 further comprising an inflight table including records that characterize the abstracted memory requests by start address, end address, and a timestamp representing a latest record update time.

13. A non-transitory computer readable medium containing instructions configured to be executed by a computer system, the instructions when executed by the computer system comprising:
receiving a read operation;
updating an operation record in a table when a read start address in the read operation corresponds with a read end address in the operation record;
updating the operation record by replacing the read end address in the operation record with a read end address of the read operation;

conducting prefetch operations according to the operation record.

14. The computer readable medium of claim 13 further comprising updating the operation record by replacing a timestamp in the operation record with a time value associated with the read operation.

15. The computer readable medium of claim 13 further comprising:
removing the operation record from the table when the table has a threshold number of operation records and a last update for the operation record was longer than all other operation records in the table; and
conducting the prefetch operations only on information contained in operation records after being removed from the table.

16. The computer readable medium of claim 13 further comprising:
identifying an address range and a starting address offset for the operation record removed from the table; and
generating count values identifying how many operation records removed from the table are within the address ranges and have the starting address offsets.

17. The computer readable medium of claim 16 further comprising:
identifying a starting address offset for a new read operation;
identifying a group of the count values that have starting address offsets corresponding with the starting address offset of the new read operation; summing all of the count values for the group; and
recommending a prefetch operation when the sum of all of the count values of the group is over a given threshold.

18. The computer readable medium of claim 17 further comprising:
identifying a highest one of the count values in the group;
identifying the address range associated with the highest one of the count values; and
prefetching an amount of data corresponding with the identified address range.

19. The computer readable medium of claim 16 further comprising identifying the starting address offsets by taking a modulus value of a starting address value.

20. A storage proxy, comprising:
an operation table configured to store a record of a contiguous address range of a plurality of contiguous address ranges of stored data, the contiguous address range formed by accumulation of sub-address ranges used by a plurality of memory access operations;
a count table containing a count value representing a number of times the record of the contiguous address range of the plurality of contiguous address ranges is formed by the memory access operations; and
a processor configured to prefetch stored data according to the count value.

21. The storage proxy according to claim 20 wherein the processor is further configured to:
receive a read operation of the plurality of memory access operations;
identify a record in an inflight table that contains an ending address corresponding with a starting address in the read operation;
replace an ending address in the identified record with an ending address of the read operation to form the contiguous address range;
increment the count value in the count table having a same address range as the contiguous address range.

22. The storage proxy according to claim 20 wherein the processor is further configured to:
group the count values in the count table according to a starting address offset of a plurality of starting address offsets of the contiguous address range;
receive a read operation;
identify the starting address offset for the read operation;
identify the group of the count values in the count table with a same starting address offset as the starting address offset of the read operation;
identify a highest one of the count values in the group of count values;
identify the contiguous address range associated with the highest one of the count values; and
prefetch data-stored at the identified contiguous address range.

23. An apparatus, comprising:
logic circuitry configured to receive a plurality of memory access requests that are abstracted from an original memory access request, the logic circuitry further configured to reconstruct characteristics of the original memory access request from the plurality of abstracted memory access request and make prefetch decisions based on the reconstructed characteristics of the original memory access request.

* * * * *